United States Patent
Kang

(10) Patent No.: US 8,508,587 B2
(45) Date of Patent: *Aug. 13, 2013

(54) IMAGING DEVICE

(75) Inventor: Woobum Kang, Osaka (JP)

(73) Assignee: Keyence Corporation, Osaka (JP)

( * ) Notice: Subject to any disclaimer, the term of this patent is extended or adjusted under 35 U.S.C. 154(b) by 370 days.

This patent is subject to a terminal disclaimer.

(21) Appl. No.: 12/613,648

(22) Filed: Nov. 6, 2009

(65) Prior Publication Data

US 2010/0149364 A1    Jun. 17, 2010

(30) Foreign Application Priority Data

Dec. 12, 2008   (JP) ................................. 2008-317074

(51) Int. Cl.
*H04N 7/00* (2011.01)
*H04N 9/47* (2006.01)
*H04N 7/18* (2006.01)
*G06K 9/00* (2006.01)
*G06K 9/74* (2006.01)
*G03B 17/18* (2006.01)

(52) U.S. Cl.
USPC ............... 348/79; 348/36; 382/133; 382/212; 396/287

(58) Field of Classification Search
USPC .................. 348/36–39, 79, 80; 359/368–378
See application file for complete search history.

(56) References Cited

U.S. PATENT DOCUMENTS

| | | | |
|---|---|---|---|
| 4,760,385 A | 7/1988 | Jansson et al. | |
| 6,392,658 B1 | 5/2002 | Oura | |
| 6,687,419 B1 | 2/2004 | Atkin | |
| 6,838,667 B2 | 1/2005 | Tsuneta et al. | |
| 7,206,017 B1* | 4/2007 | Suzuki | ........................... 348/36 |
| 2001/0055429 A1 | 12/2001 | Hirosawa et al. | |
| 2003/0122949 A1 | 7/2003 | Kanematsu et al. | |
| 2004/0119817 A1 | 6/2004 | Maddison et al. | |
| 2004/0131348 A1 | 7/2004 | Ohba et al. | |

(Continued)

FOREIGN PATENT DOCUMENTS

| | | |
|---|---|---|
| JP | 09-284542 | 10/1997 |
| JP | 09-322060 | 12/1997 |

(Continued)

OTHER PUBLICATIONS

Office Action issued by the U.S. Patent and Trademark Office in related U.S. Appl. No. 12/613,594 dated Apr. 3, 2012 (20 pages).

(Continued)

*Primary Examiner* — Christopher S Kelley
*Assistant Examiner* — Hee-Yong Kim
(74) *Attorney, Agent, or Firm* — Kilyk & Bowersox, P.L.L.C.

(57) ABSTRACT

The present invention provides an imaging device capable of displaying the whole of a display mosaic image in a screen even when the image size of the mosaic image is largely changed, the imaging device including: a mosaic image generation unit which assembles a plurality of still images, and generates the mosaic image; a relative position determination unit which determines a relative position between a frame image and the mosaic image; a display reduction unit which reduces the frame image and the mosaic image respectively based on the image size of the mosaic image, and generates a display frame image and a display mosaic image; and a live image display unit which updates a display position of the frame image with respect to the mosaic image based on a determination result of the relative position.

10 Claims, 12 Drawing Sheets

(56) References Cited

U.S. PATENT DOCUMENTS

| | | | |
|---|---|---|---|
| 2004/0170312 A1* | 9/2004 | Soenksen | 382/133 |
| 2004/0189849 A1 | 9/2004 | Hofer | |
| 2004/0218833 A1 | 11/2004 | Ejiri et al. | |
| 2005/0163398 A1 | 7/2005 | Ioka | |
| 2005/0180611 A1 | 8/2005 | Oohashi et al. | |
| 2006/0045388 A1* | 3/2006 | Zeineh et al. | 382/312 |
| 2007/0025723 A1* | 2/2007 | Baudisch et al. | 396/287 |
| 2007/0187571 A1 | 8/2007 | Ebe et al. | |
| 2008/0074489 A1 | 3/2008 | Zhang et al. | |

FOREIGN PATENT DOCUMENTS

| | | |
|---|---|---|
| JP | 11-205675 | 7/1999 |
| JP | 11-264937 | 9/1999 |
| JP | 200-090232 | 3/2000 |
| JP | 2003-087549 | 3/2003 |
| JP | 2004-312549 | 11/2004 |
| JP | 2004-343222 | 12/2004 |
| JP | 2005-012517 | 1/2005 |
| JP | 2005-223524 | 8/2005 |
| JP | 2005-303594 | 10/2005 |

OTHER PUBLICATIONS

Office Action issued by the U.S. Patent and Trademark Office in related U.S. Appl. No. 12/613,572 dated Sep. 7, 2012 (20 pages).

* cited by examiner

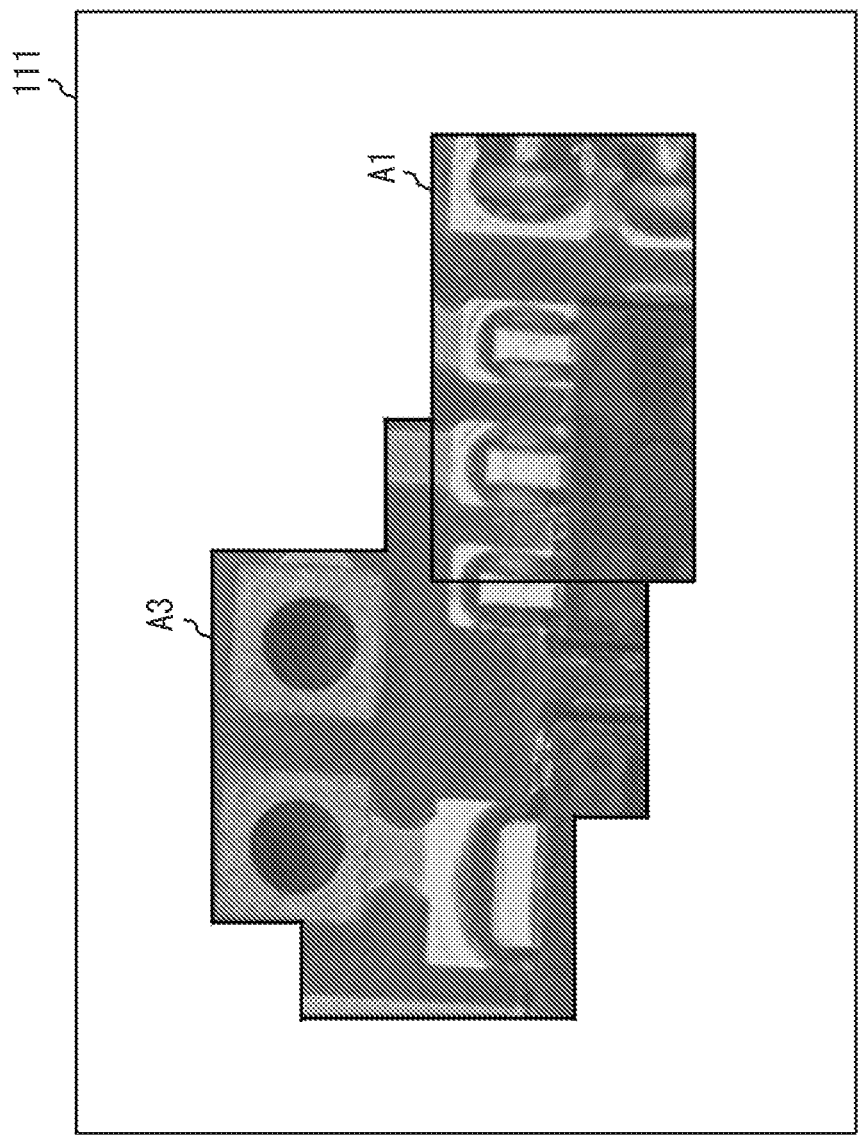

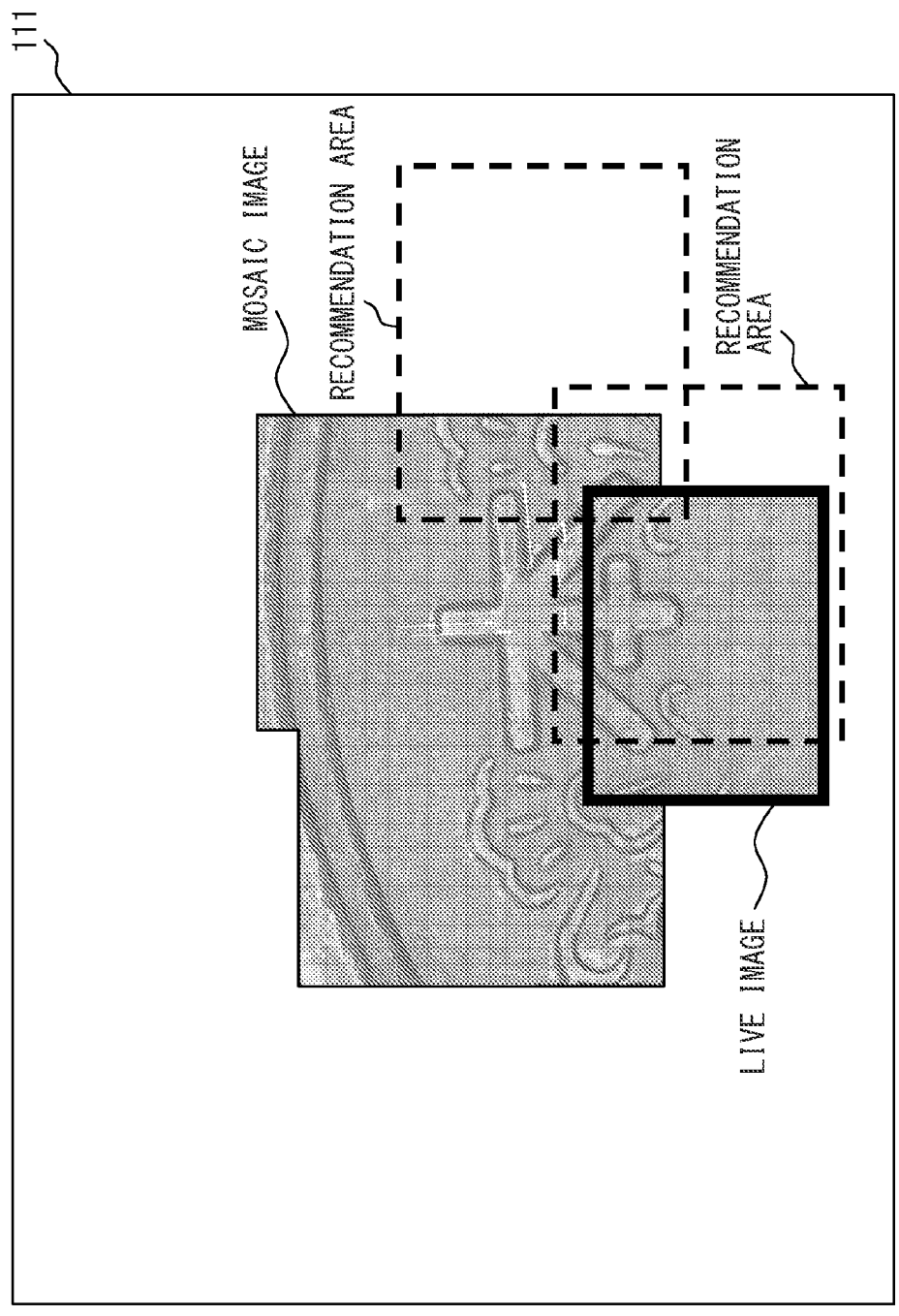

IMAGING DEVICE

CROSS REFERENCE TO RELATED APPLICATIONS

The present application claims foreign priority based on Japanese Patent Application No. 2008-317074, filed Dec. 12, 2008, the contents of which is incorporated herein by reference.

BACKGROUND OF THE INVENTION

1. Field of the Invention

The present invention relates to imaging devices and, more particularly, relates to an imaging device capable of displaying a moving picture image, which is generated by a camera that photographs an object to be inspected, on a mosaic image that is wider in field of view than an actual field of view of the camera.

2. Description of the Related Art

An image mosaic is known in the related art as a technique which creates a sheet of an image with a wide field of view that is wider in field of view than an actual field of view of a camera by assembling a plurality of still images photographed while changing a field of view. In the case of an imaging device such as a digital microscope which photographs a photographic subject enlarged by an objective lens, a field of view can be changed by moving a movable stage on which an object to be inspected is mounted. The image with a wide field of view is called as a mosaic image, and is created by coupling the plurality of still images photographed while changing the field of view in such a manner based on a relative position between images.

For example, in the case of the known imaging device which is equipped with a sensor that detects a position of a movable stage and automatically photographs a photographing range specified by a user, a relative positional relationship between images is judged by control information of the movable stage, and assembly of still images is performed. In such imaging device, when the photographing range is specified and photographing is once started, the photographing range cannot be changed in mid-flow. Furthermore, the position of the movable stage needs to be highly accurately detected; and therefore, there is a problem in that system configuration becomes complicated and high cost.

On the other hand, there is also an imaging device which judges a relative positional relationship between images by pattern matching between the images and assembly of still images is performed. However, there is not an imaging device capable of fetching still images and coupling the same with a mosaic image while making a user confirm a positional relationship between a field of view during photographing and the mosaic image during creation on a display unit. Consequently, there is conceivable an imaging device in which still images are fetched at timing specified by a user and are assembled to a mosaic image while displaying a field of view during photographing as a moving image on the mosaic image. In such imaging device, the image size of the mosaic image varies by the assembly; and therefore, there is a problem in that a part of the mosaic image is not displayed on a screen and a positional relationship between the field of view during photographing and the mosaic image during creation becomes unclear.

BRIEF SUMMARY OF THE INVENTION

The present invention has been made in view of the above circumstances, and an object of the present invention is to provide an imaging device capable of easily recognizing a positional relationship between a field of view during photographing and a mosaic image during creation. More particularly, another object of the present invention is to provide an imaging device capable of displaying the whole of a display mosaic image in a screen even when the image size of the mosaic image is largely changed before and after the assembly in the case of fetching a still image and assembling the same to the mosaic image while displaying the field of view during photographing as a moving picture image at an appropriate position on the mosaic image.

An imaging device of a first aspect of the present invention includes: a movable stage capable of moving in two different directions while mounting an object to be inspected; a camera which is arranged in face-to-face relation to the movable stage, photographs the object to be inspected, and generates a moving picture image made of a plurality of continuous frame images; a mosaic image generation unit which assembles not less than two still images photographed by the camera, and generates a mosaic image that is wider in field of view than the actual field of view of the camera; a relative position determination unit which determines a relative position between the frame image and the mosaic image; a display reduction unit which reduces the frame image and the mosaic image respectively based on the image size of the mosaic image, and generates a display frame image and a display mosaic image; and a live image display unit which updates a display position of the display frame image with respect to the display mosaic image based on a determination result of the relative position, and displays a moving picture image configured by the display frame image on the display mosaic image.

In the imaging device, the field of view during photographing is displayed as the moving picture image made of the display frame images at an appropriate position on the display mosaic image, and the still images photographed by the camera are fetched and assembled on the mosaic image; and accordingly, a new mosaic image is generated. Then, when the frame image and the mosaic image are reduced respectively to generate the display frame image and the display mosaic image, reduction in image is performed based on the image size of the mosaic image. According to such a configuration, the reduction in image is performed based on the image size of the mosaic image; and therefore, even when the image size of the mosaic image is largely changed before and after the assembly, the whole of the display mosaic image can be displayed in a screen. Therefore, a positional relationship between the field of view during photographing and the mosaic image during creation can be easily recognized.

In the imaging device of a second aspect of the present invention, in addition to the above configuration, the display reduction unit reduces the frame image and the mosaic image so that the whole of the display mosaic image is displayed in a screen. According to such a configuration, in the case of displaying the moving picture image made of the display frame images on the display mosaic image as a live image, the whole of the mosaic image is always displayed in the screen, and therefore, a user can easily recognize that a positional relationship between the field of view during photographing and the mosaic image during creation.

According to such a configuration, in the case of displaying the moving picture image made of the display frame images as the live image on the display mosaic image, the whole of the mosaic image and the whole of the frame image are always displayed at the same time; and therefore, a user can easily recognize that a positional relationship between the field of view during photographing and the mosaic image during creation.

In the imaging device of a fourth aspect of the present invention, in addition to the above configuration, the display reduction unit reduces the frame image and the mosaic image while retaining an aspect ratio of an image constant.

In the imaging device of a fifth aspect of the present invention, in addition to the above configuration, the display reduction unit updates a reduction ratio in the case of reducing the frame image and the mosaic image each time the display position of the display frame image with respect to the display mosaic image is updated. According to such a configuration, the reduction ratio in the case of reducing the frame image and the mosaic image is updated each time the display position of the display frame image is updated; and therefore, the whole of the display mosaic image and the display frame image can be appropriately displayed in a screen by following the update of the display position.

The imaging device of a sixth aspect of the present invention, in addition to the above configuration, further includes: a recommendation area display unit including the mosaic image and an overlapping area, and displaying a moving recommendation area of a frame image capable of determining the relative position between the frame image and the mosaic image, wherein the display reduction unit reduces the frame image and the mosaic image so that the frame image and the mosaic image in the moving recommendation area are displayed at the same time.

The imaging device of an eighth aspect of the present invention, in addition to the above configuration, further includes: a positioning reduction section which reduces the frame image and the mosaic image at a constant reduction ratio respectively, and generates a positioning frame image and a positioning mosaic image; and a feature quantity extraction unit which extracts feature quantity from the positioning frame image and the positioning mosaic image, wherein the relative position determination unit determines a relative position between the positioning frame image and the positioning mosaic image by comparison of the feature quantity; and wherein the display reduction unit reduces the frame image and the mosaic image so that the whole of the display mosaic image and the whole of the display frame image, a part of the display frame image overlapping with the positioning mosaic image, and corresponding to the positioning frame image at any position that has an overlap area necessary for determination of the relative position are displayed in a screen. According to such a configuration, by comparison of the feature quantity extracted from the positioning frame image and the positioning mosaic image, the relative position between these images is determined; and therefore, it becomes possible to suppress system configuration from being complicated.

According to such a configuration, when the image size of the mosaic image exceeds the constant size, the reduction ratio in the case of reducing the frame image and the mosaic image is fixed; and therefore, it becomes possible to suppress that a positional relationship between the field of view during photographing and the mosaic image during creation cannot be recognized since the image size becomes too small.

According to an imaging device of the present invention, reduction in image is performed based on the image size of a mosaic image; and therefore, even when the image size of the mosaic image is largely changed before and after the assembly, the whole of the display mosaic image can be displayed in a screen. Thus, the whole of the display mosaic image is displayed in a screen in the case of fetching a still image and assembling the same to the mosaic image while displaying a field of view during photographing as a moving picture image at an appropriate position on the mosaic image; and therefore, a positional relationship between the field of view during photographing and the mosaic image during creation can be easily recognized.

BRIEF DESCRIPTION OF THE SEVERAL VIEWS OF THE DRAWING

FIG. 5 is an explanation view exemplarily showing an example of operation during displaying a live image of the magnification observation device shown in FIG. 1, and showing a live screen;

FIG. 12 is a view showing an example of operation during displaying a live screen in the magnification observation device shown in FIG. 11, and showing a moving recommendation area displayed on a mosaic image.

DETAILED DESCRIPTION OF THE INVENTION

Preferred Embodiment 1
<Magnification Observation Device>

Figure 1:
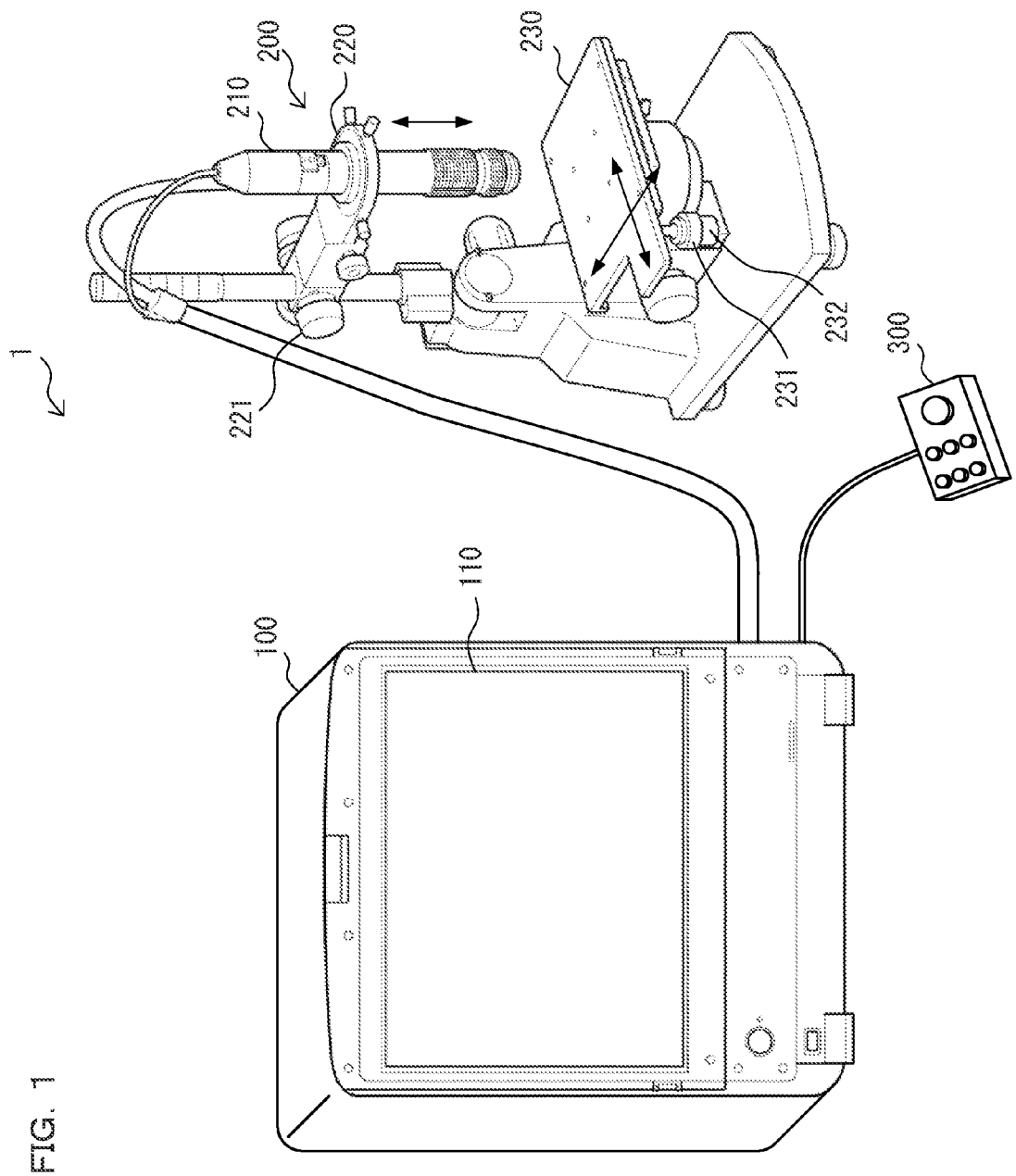
FIG. 1 is a view showing an example of a schematic configuration of an imaging device according to a preferred embodiment of the present invention, and showing a magnification observation device as an example of the imaging device.

FIG. 1 is a system view showing an example of a schematic configuration of an imaging device according to a preferred embodiment 1 of the present invention; and as an example of the imaging device, there is shown a magnification observation device 1 which includes a system body 100, a camera unit 200, and a console 300. The magnification observation device 1 is a digital microscope which generates a moving picture image by photographing a photographic subject enlarged by an objective lens and can display the moving picture image on a display unit 110 of the system body 100.

The camera unit 200 is a photographing unit which is for photographing an object to be inspected while changing a field of view, and includes a camera 210, a movable holder 220, and a movable stage 230. The camera 210 is a read device which photographs the object to be inspected as the photographic subject and generates a moving picture image made of a plurality of frame images that continue at a constant frame rate, and is configured by arranging an objective lens, a charge coupled device (CCD) image sensor, an illumination device, and the like in a cylindrical housing.

The movable holder 220 is a retention unit which movably retains the camera 210 in a direction parallel to a central axis of the objective lens. In this case, the direction parallel to the central axis of the objective lens of the camera 210 is referred to as a z axis direction, and a position of the z axis direction of the camera 210 can be adjusted by turning a positional adjustment knob 221.

The movable stage 230 is a retention unit which retains the object to be inspected, and is movable in the face which is intersected with the z axis in a state where the object to be inspected is mounted. In this case, a plain face perpendicular to the z axis is referred to as an xy plain face, a position in the xy plain face of the movable stage 230 can be adjusted by turning positional adjustment knobs 231 and 232. That is, the movable stage 230 is a stage which can move in two different directions while mounting the object to be inspected by turning the positional adjustment knobs 231 and 232.

More specifically, a position of an x axis direction is adjusted by turning the positional adjustment knob 231, and a position of a Y axis direction can be adjusted by turning the positional adjustment knob 232. The camera 210 is arranged in face-to-face relation to such movable stage 230.

The console 300 is an input device which is for instructing start and completion of photographing, fetch of photographed image data, and the like to the system body 100.

The system body 100 is an image process device which displays the moving picture image photographed by the camera 210 on the display unit 110 and generates a mosaic image that is wider in field of view than the actual field of view of the camera 210 by assembling the frame images which constitute the moving picture image.

<System Body>

Figure 2:
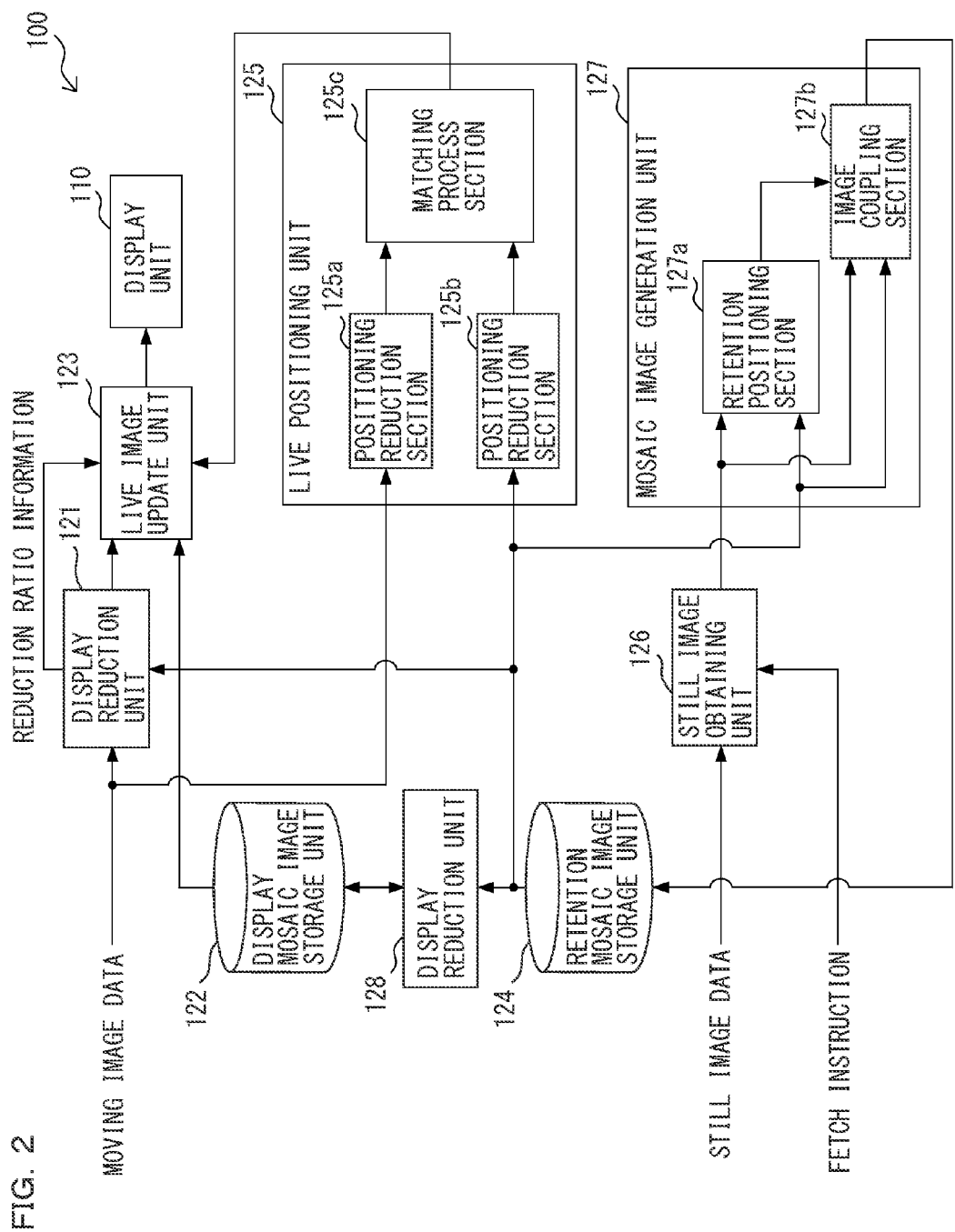
FIG. 2 is a block diagram showing a configuration example in a relevant portion of the magnification observation device shown in FIG. 1, and showing an example of a functional configuration in a system body.

FIG. 2 is a block diagram showing a configuration example in a relevant portion of the magnification observation device 1 shown in FIG. 1, and showing an example of a functional configuration in the system body 100. The system body 100 is configured by providing display reduction units 121 and 128, a display mosaic image storage unit 122, a live image update unit 123, a retention mosaic image storage unit 124, a live positioning unit 125, a still image obtaining unit 126, and a mosaic image generation unit 127, in addition to the display unit 110.

The display reduction unit 121 operates to process moving image data obtained from the camera 210, and to generate reduced moving image data having reduced image size. More specifically, operation is performed that the display reduction unit 121 reduces the frame image continuously obtained from the camera 210 at a predetermined reduction ratio, generates a display frame image, and outputs the same to the live image update unit 123. Reduction of the frame image is performed, for example, by a pixel skipping process and averaging procedure of pixel values. In this case, a reduction process is performed so as not to change an aspect ratio, that is, an aspect ratio of the frame image before and after the reduction.

The display mosaic image storage unit 122 is a mosaic image retention unit which retains a display mosaic image, and is configured by, for example, a volatile semiconductor memory. The live image update unit 123 operates to control the display unit 110 based on reduction ratio information sent from the display reduction unit 121 and to update a display position of the display frame image continuously obtained from the display reduction unit 121 with respect to the display mosaic image, and accordingly to display a live image on the display mosaic image. The live image is a moving picture image which is made of a plurality of continuous display frame images.

The retention mosaic image storage unit 124 is a mosaic image retention unit which retains a retention mosaic image, and is configured by a nonvolatile memory element, for example, a hard disk drive (HDD).

The live positioning unit 125 includes positioning reduction sections 125a and 125b, and a matching process section 125c. The live positioning unit 125 operates to reduce the frame images continuously obtained from the camera 210 and the retention mosaic image read out from the retention mosaic image storage unit 124, respectively and to perform a matching process.

The positioning reduction section 125a operates to reduce the frame image obtained from the camera 210 at a constant reduction ratio for positioning, to generate a positioning frame image, and to output the same to the matching process section 125c. The positioning reduction section 125b operates to reduce the retention mosaic image read out from the retention mosaic image storage unit 124 at a constant reduction ratio for positioning, to generate a positioning mosaic image, and to output the same to the matching process section 125c.

The matching process section 125c operates to use pattern matching between the positioning frame image and the positioning mosaic image to determine a relative position therebetween, to generate relative position information, and to output the same to the live image update unit 123.

The live image update unit 123 operates to decide a relative position between the display frame image and the display mosaic image based on relative position information received from the live positioning unit 125, and to update a display position of the display frame image with respect to the display mosaic image of the frame image for display.

In this case, the live positioning unit 125 is a process unit which executes a matching process with lower accuracy than a retention positioning section 127a, and outputs low accurate coordinate data as relative position information.

The still image obtaining unit 126 operates to obtain a still image photographed by the camera 210 based on a fetch instruction from the console 300, and to output the same to the mosaic image generation unit 127. The assembling still image obtained from the camera 210 may be an image that is different in imaging conditions such as an exposure time from a moving picture image or may be one of the frame images which constitute the moving picture image.

The mosaic image generation unit 127 includes the retention positioning section 127a and an image coupling section 127b, and operates to generate a retention mosaic image by assembling a plurality of still images.

The retention positioning section 127a operates to determine a relative position between the still image obtained by the still image obtaining unit 126 and the retention mosaic image read out from the retention mosaic image storage unit 124. The determination of the relative position is performed by pattern matching between the still image and the retention mosaic image, and the relative position between the still image and the retention mosaic image is estimated at higher resolution than that of the positioning mosaic image.

The image coupling section 127b operates to assemble the still image and the retention mosaic image based on a determination result by the retention positioning section 127a, to generate a new retention mosaic image, and to update the retention mosaic image in the retention mosaic image storage unit 124. More specifically, the still image obtained by the still image obtaining unit 126 and the retention mosaic image read out from the retention mosaic image storage unit 124 are assembled based on the relative position between the images estimated by the retention positioning section 127a, so that the new retention mosaic image is generated.

The assembly of the still image and the retention mosaic image is performed by coupling both images based on the relative position between these images. Furthermore, in the case of coupling the still image and the retention mosaic image, a blending process of pixel values is performed for an overlapping area of both images in order to make a join less noticeable. The blending process is an image process which performs weighted average of pixel values between both images and obtains a pixel value of a composite image, and weight in the case of performing weighted average is appropriately changed in response to a pixel position, which makes the join less noticeable.

In this case, the retention mosaic image is retained by dividing into a constant size, for example, a plurality of image tiles of 512 by 512 pixels; and in the case of updating the retention mosaic image, only a necessary portion is read out on a memory and an updating process is performed.

The display reduction unit 128 operates to read out an updated retention mosaic image from the retention mosaic image storage unit 124 each time the retention mosaic image is updated, to reduce the read out retention mosaic image for display, and to generate the display mosaic image.

The display reduction units 121 and 128 operate to reduce the frame image and the retention mosaic image respectively based on the image size of the retention mosaic image, and to generate the display frame image and the display mosaic image. More specifically, a reduction ratio in the case of reducing the frame image and the retention mosaic image is decided each time the retention mosaic image is updated, and a process of reducing these images is performed.

The reduction ratio is decided based on the resolution of the display unit 110 and the size of a monitor screen of the live image so that, for example, the whole of the display mosaic image and the whole of the display frame image are displayed in the screen at the same time. The reduction ratio is decided from the image size of the mosaic image and the reduction process of a display image is performed each time the retention mosaic image is updated; and therefore, it makes possible to automatically adjust a display magnification in response to size of the mosaic image and to display the live image.

In this case, the reduction ratio is set so that the whole of the display mosaic image and the whole of the display frame image are displayed in the screen, a part of the display frame image being overlapped with the positioning mosaic image and corresponding to the positioning frame image at any position that has an overlap area necessary for determination of the relative position.

Generally, in the case where a relative positional relationship between the still image and the retention mosaic image is judged by pattern matching between these images, an overlapping area not less than a constant size needs to be present between the still image and the retention mosaic image in order to ensure positioning accuracy of not less than a constant level. Furthermore, in the case of making the join less noticeable by the blending process when the still image and the retention mosaic image are coupled, an overlapping area of not less than a constant amount needs to be present between the still image and the retention mosaic image in order to smoothly couple with smoothness of not less than a constant level.

In the display reduction units 121 and 128, the reduction ratio is set so that the whole of the display frame image corresponding to the positioning frame image at any position having the above described overlapping area as the overlap area and the whole of the display mosaic image are always displayed in the screen.

Furthermore, first, with respect to each image tile of the retention mosaic image, a full scale image is retained as a display on-memory image of the mosaic image; and if the display mosaic image cannot be fit in the monitor screen of the live image, each image tile is reduced, for example, a ½ image is created to be served as the display on-memory image. At this time, the full scale image is deleted from the memory. Further, in the case where the display mosaic image is not fit in the monitor screen, for example, a ¼ image is created from the ½ image for respective image tiles, and the display on-memory image is updated.

As described above, each image tile is reduced in series each time the display mosaic image is not fit in the monitor screen by assembly of new still images. An image tile changed by the assembly of the still images or a newly added image tile reads out the full scale image and is reduced in accordance with the size of the present display on-memory image.

<Matching Process Section>

Figure 3:
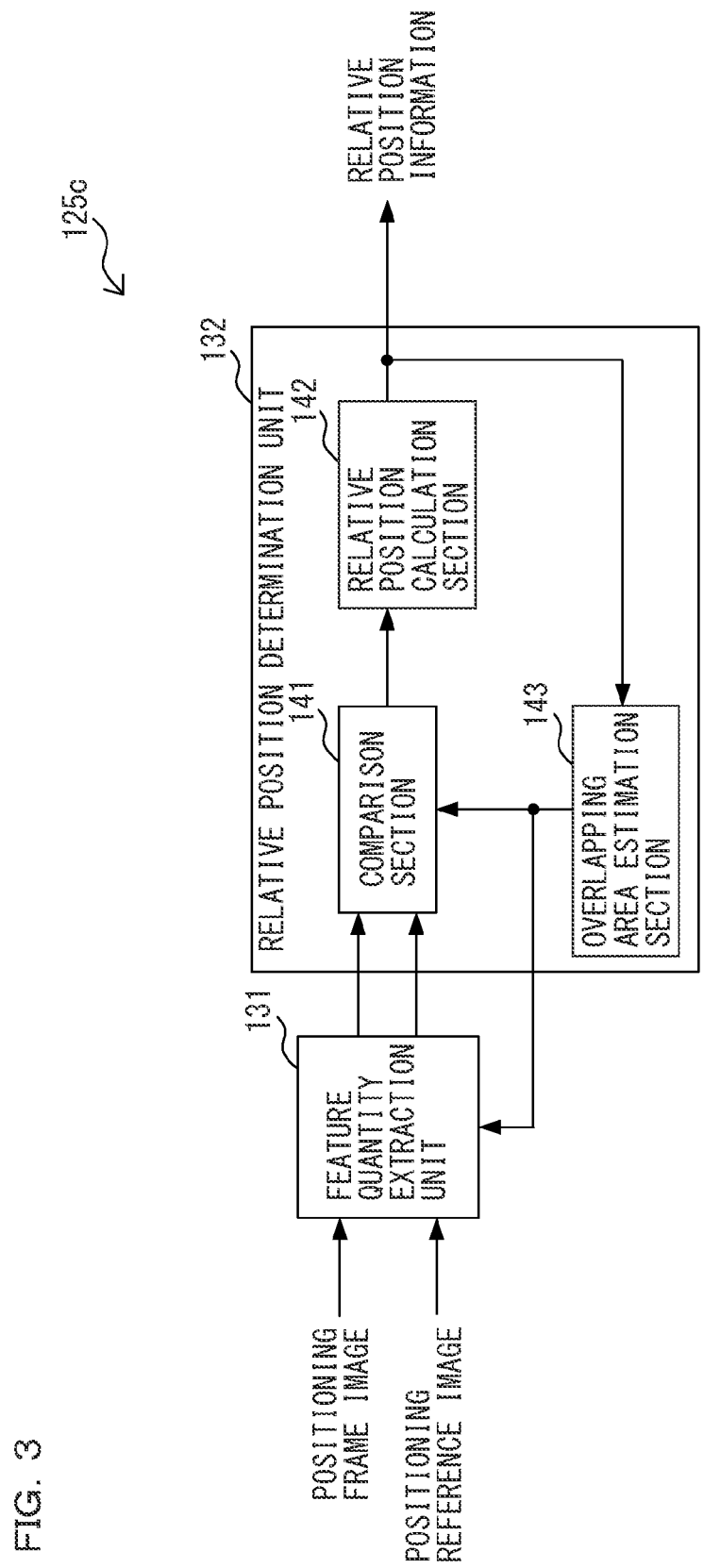
FIG. 3 is a block diagram showing a configuration example of a matching process section in the system body shown in FIG. 2.

FIG. 3 is a block diagram showing a configuration example of the matching process section 125c in the system body 100 shown in FIG. 2. The matching process section 125c includes a feature quantity extraction unit 131 and a relative position determination unit 132.

The feature quantity extraction unit 131 operates to extract feature quantity from the positioning frame image and the positioning mosaic image, respectively. As the feature quantity, any feature quantity may be used as long as the feature quantity becomes a marker in the case of comparing images; however, in this case, the top in which a plurality of edges are intersected is extracted as a feature point.

The relative position determination unit 132 includes a comparison section 141, a relative position calculation section 142, and an overlapping area estimation section 143. The relative position determination unit 132 operates to determine a relative position between the positioning frame image and the positioning mosaic image by comparison of the feature points. The comparison section 141 operates to compare a feature point extracted from the positioning frame image with a feature point extracted from the positioning mosaic image, and to output its comparison result to the relative position calculation section 142.

The comparison of the feature points is performed, for example, by extracting an area including a feature point from one pixel as a template and by searching an area most similar to the template area from the other image. As an index which measures the degree of similarity between the areas, there are conceivable a method of using error sum of squares of a luminance value obtained for a pixel in the area and a method of using normalized correlation in which a luminance value of each pixel in the area is normalized by average luminance.

The relative position calculation section 142 operates to determine the relative position between the positioning frame image and the positioning mosaic image based on the comparison result by the comparison section 141, to output its determination result to the overlapping area estimation section 143, and to output the relative position information to the live image update unit 123.

The overlapping area estimation section 143 operates to estimate an overlapping area of the present positioning frame image and the positioning mosaic image based on the determination result of the past relative position related to the positioning frame image. For example, operation is performed that an overlapping area of the frame image and the positioning mosaic image is set from the determination result of a relative position related to a positioning frame image previously provided by one frame, and the overlapping area is judged as the overlapping area of the present frame image and the mosaic image.

The comparison section 141 operates to compare for feature points in the overlapping area estimated by the overlapping area estimation section 143, and to output its comparison result to the relative position calculation section 142. Then, as a result of comparing for the feature points in the overlapping area, in the case where the relative position cannot be determined, operation is performed that the whole feature points of the positioning frame image and the whole feature points of the positioning mosaic image are compared, and its comparison result is outputted to the relative position calculation section 142.

Furthermore, operation is performed that the whole feature points of the positioning frame image and the whole feature points of the positioning mosaic image are compared for a first positioning frame image, and its comparison result is outputted to the relative position calculation section 142. That is, as for a first frame positioning frame image, the whole feature points of each image are compared to determine the relative position. On the other hand, as for positioning frame images subsequent a second frame, first, feature points in the overlapping area estimated from the determination result of the past relative position related to the frame images are compared to determine the relative position. At this time, if the relative position cannot be determined, the whole feature points of each image are compared to determine the relative position.

In this case, the first frame image is, for example, a first obtained frame image after restarting photographing in the case where photographing is once stopped in the middle of creating the mosaic image and then photographing is restarted.

Generally, in the case where each feature point is extracted from two still images in which each part of the images is overlapped and a group of corresponding feature points is searched between these images, a way of extracting the feature point from the overlapping area of both images and searching the group of corresponding feature point becomes lower in the occurrence probability of false response than that of searching by extracting the feature point from the whole of the images. That is, comparison is preferentially made for the feature point in the overlapping area to determine the relative position; and accordingly, a probability of succeeding in positioning of the positioning frame image can be improved. Further, positioning speed can be improved as compared with the comparison is made for the whole feature points in the screen.

In this case, when the feature quantity extraction unit 131 extracts the feature point from the present positioning frame image, the feature point is extracted from the overlapping area estimated by the overlapping area estimation section 143. Then, in the case where the relative position cannot be determined by only the feature point in the overlapping area, operation of extracting the feature point from an area other than the overlapping area is also performed.

The live image update unit 123 operates to update a display positioning in the case of displaying the moving picture image which is made of the display frame images on the display mosaic image as the live image based on the determination result of the relative position by the relative position calculation section 142, and to output its display data to the display unit 110.

<Live Screen>

Figure 4:
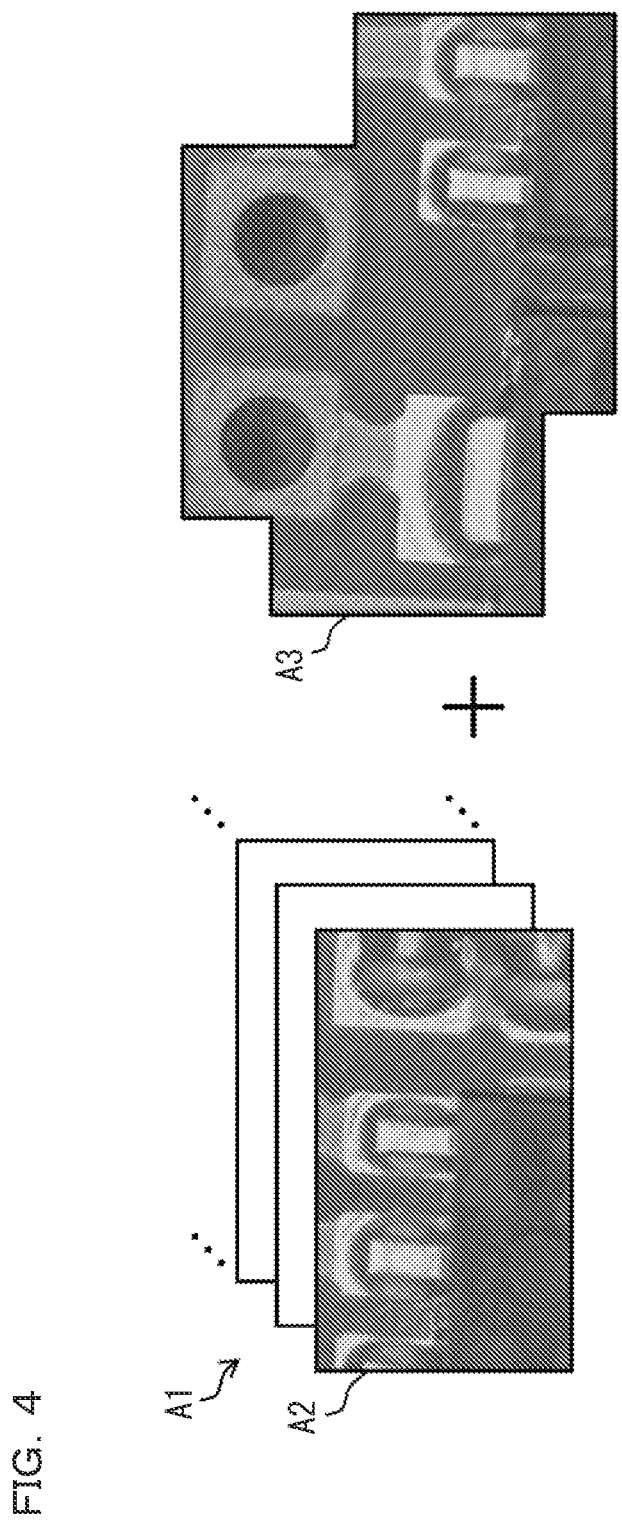
FIG. 4 is an explanation view exemplarily showing an example of operation during displaying a live image in the magnification observation device shown in FIG. 1, and showing a moving picture image A1 and a display mosaic image A3.

FIGS. 4 and 5 are explanation views each exemplarily showing an example of operation during displaying the live image in the magnification observation device 1 shown in FIG. 1. FIG. 4 shows a moving picture image A1 and a display mosaic image A3 photographed by the camera 210. Furthermore, FIG. 5 shows a live screen 111 in which the moving picture image A1 is arranged as the live image on the mosaic image A3.

The moving picture image A1 is made of display frame images A2 which are repeatedly generated at a constant frame rate. For example, the display frame image A2 is generated at 15 frames per second (fps). In this case, imaging magnification and a focus position are fixed.

The display mosaic image A3 is a mosaic image which is created by reducing the retention mosaic image for displaying the live screen.

The live screen 111 is a monitor screen displayed on the display unit 110, and the display mosaic image A3 and the moving picture image A1 during creation are displayed thereon. In the live screen 111, the moving picture image A1 is arranged at a display position which is decided from the relative position determined by pattern matching between the present positioning frame image and the positioning mosaic image.

That is, the moving picture image A1 during photographing is displayed as the live image at an appropriate position on the display mosaic image A3 during creation; and therefore, a user can fetch still images and couple the same to the retention mosaic image while confirming a positional relationship between a field of view during photographing and the mosaic image during creation.

<Pattern Matching>

Figure 6A:
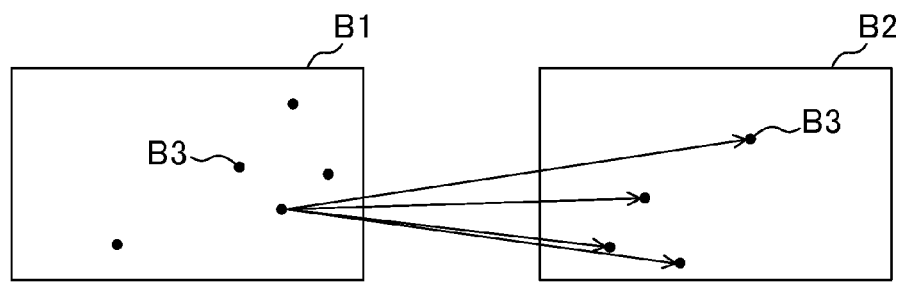
FIGS. 6A and 6B are diagrams each showing an example of operation of pattern matching in the magnification observation device shown in FIG. 1, and showing a state in which right correspondence between feature points is extracted by comparison of the whole feature points B3.
Figure 6B:
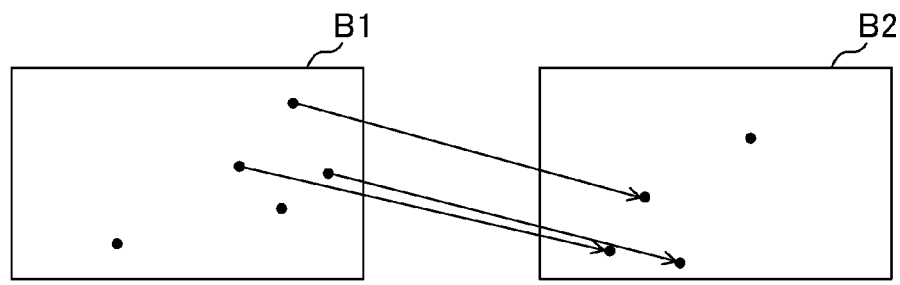

FIGS. 6A and 6B are diagrams each showing an example of operation of pattern matching in the magnification observation device 1 shown in FIG. 1, and there is shown a state in which right correspondence between these feature points is extracted by comparison of the whole feature points B3 each extracted from the reference image B1 and the positioning frame image B2. FIG. 6A shows a state in which the feature point B3 extracted from the reference image B1 is compared with each feature point B3 in the frame image B2; and FIG. 6B shows the right correspondence between the feature points extracted based on the comparison of the feature point B3.

The reference image B1 is a part of the mosaic image during creation and is previously extracted from the positioning mosaic image as a processing object of the pattern matching. For example, a finally coupled still image is extracted as the reference image B1.

In the case where a positional relationship between the reference image B1 and the frame image B2 is unclear, the feature point B3 is extracted by setting the whole of the image as an object. Then, a judgment is made by comparison between the feature points as to whether or not a similar feature point is present in the frame image B2 for the respective feature points B3 extracted from the reference image B1.

The degree of similarity between the feature points can be measured by a predetermined area including the feature point B3, for example, error sum of squares or normalized correlation of a luminance value calculated for a rectangular area of 5 pixels by 5 pixels.

The right correspondence between the feature points is extracted based on such a comparison result. For example, correspondence between the feature points moved in parallel in the same direction is extracted as right correspondence. The relative position between the reference image B1 and the frame image B2 is determined by judging the amount of movement in the image of the feature point based on the right correspondence between the extracted feature points and by judging the amount of movement of the frame image B2 with respect to the reference image B1 from the amount of movement.

On the other hand, in the case where a rough positional relationship between the reference image B1 and the frame image B2 is previously known, a template area is appropriately extracted from one image and the vicinity of a corresponding area of the other image is searched; and accordingly, the relative position between these images can be determined with higher accuracy.

That is, from a determination result of the relative position between an (n−1)th frame image previously provided by one frame and the reference image, an overlapping area B4 of these images is obtained. The overlapping area B4 is judged as overlapping areas B5 and B6 of the present nth frame image and the reference image. Then, by extracting a similar feature point from the overlapping area B6 of the nth frame image for the respective feature points B3 in the overlapping area B5 of the reference image, the relative position between these images can be determined.

The extraction of the similar feature point is performed by extracting a predetermined area near a position corresponding to the feature points from the overlapping area B6 of the nth frame image for the respective feature points B3 in the overlapping area B5 of the reference image, and by searching the inside of the area.

In the present preferred embodiment, a method in which the comparison is made for the feature points in the overlapping area is adopted with respect to positioning of the positioning frame image subsequent to the second frame and the positioning mosaic image. On the other hand, a method in which the comparison is made for the whole feature points is adopted, in the case where the relative position cannot be determined by the positioning of the positioning frame image of the first frame and the positioning mosaic image and by the comparison of the feature points in the overlapping area, or in the case of positioning of the still image fetched based on the fetch instruction and the retention mosaic image.

<Display Range>

Figure 7:
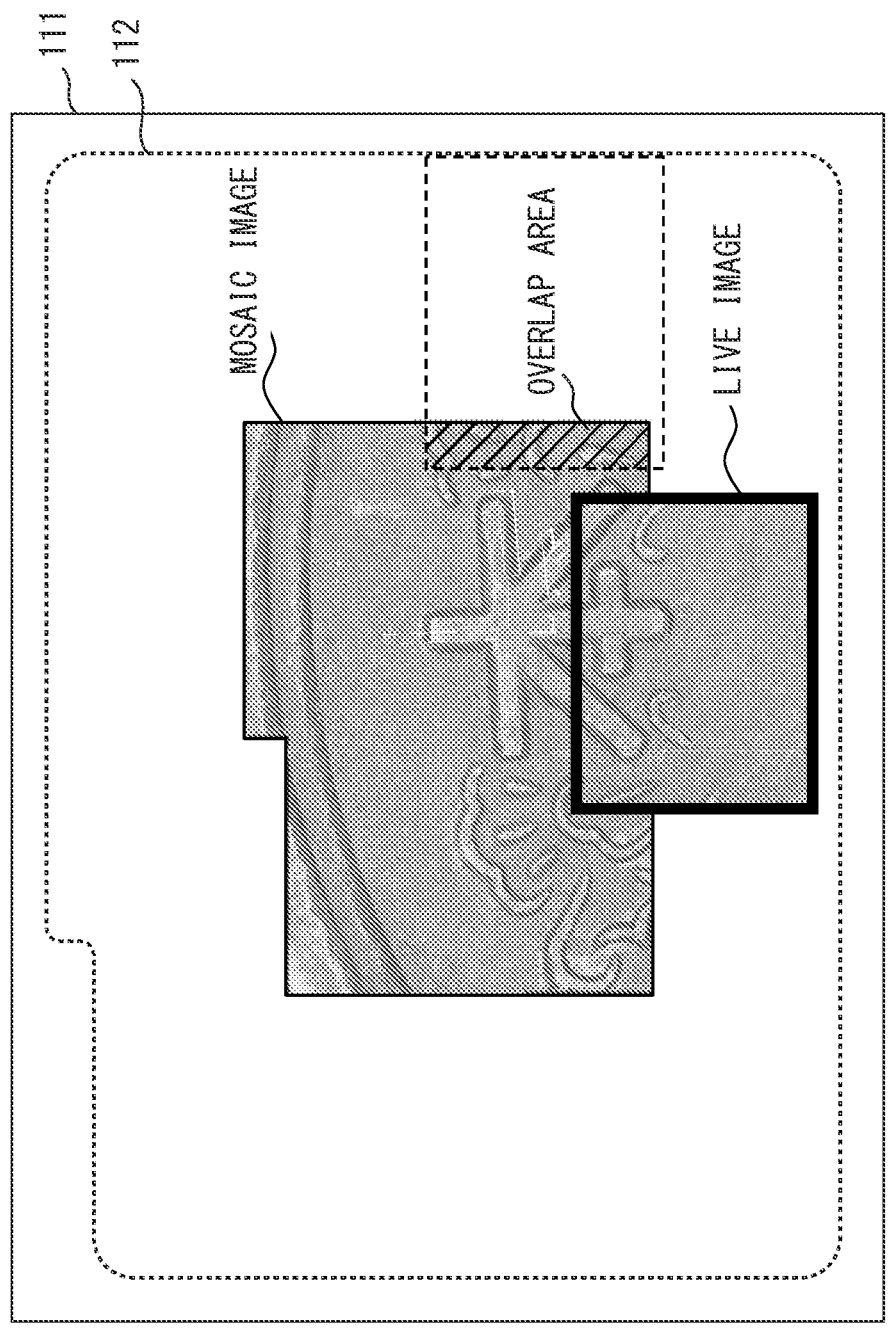
FIG. 7 is a view showing an example of operation during displaying a live image in the magnification observation device shown in FIG. 1, and showing the live screen on which a mosaic image and a live image are displayed.
Figure 8:
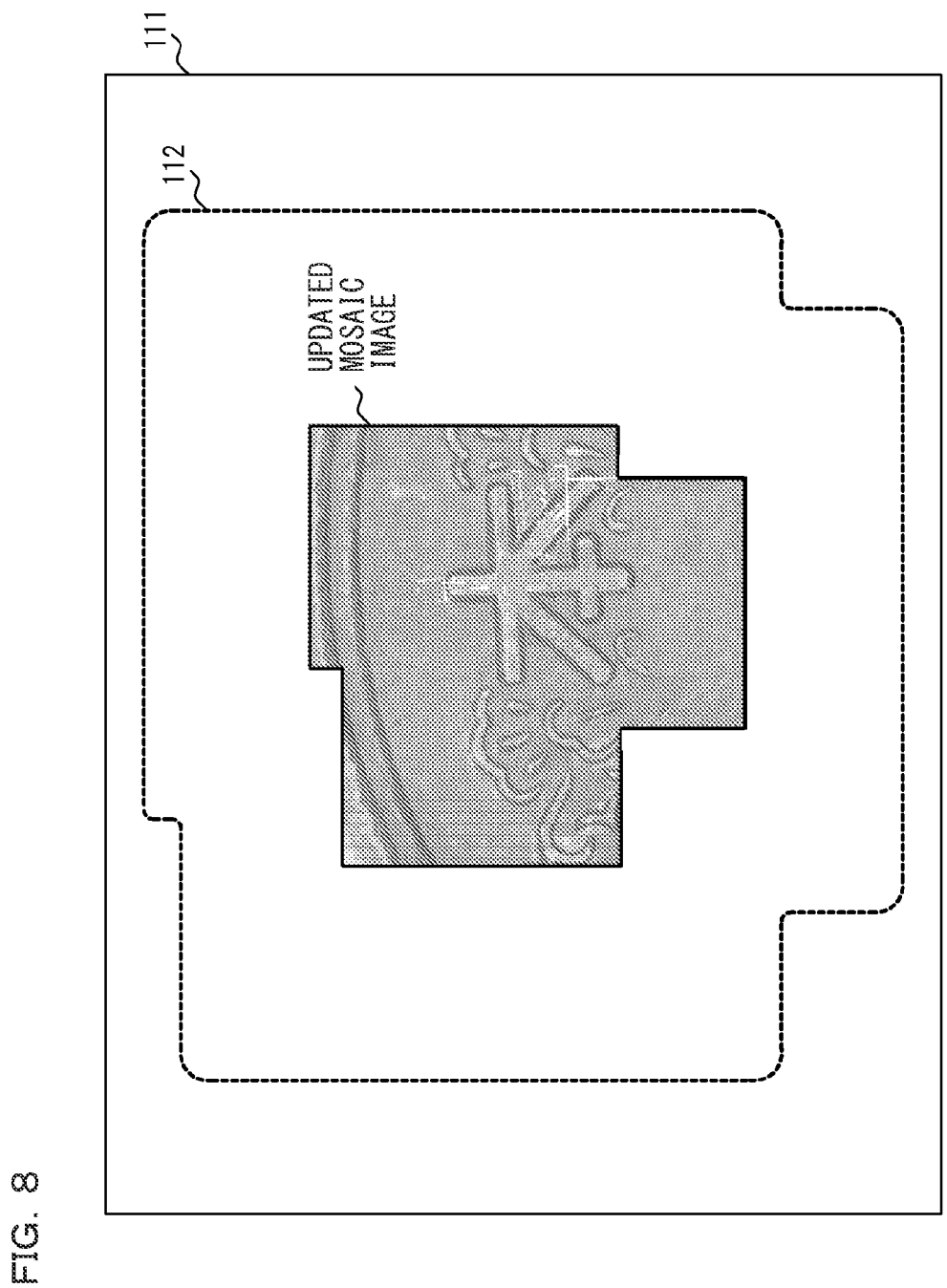
FIG. 8 is a view showing an example of operation during displaying a live image in the magnification observation device shown in FIG. 1, and showing a display mosaic image updated by assembling still images.

FIGS. 7 and 8 are diagrams each showing an example of operation during displaying the live image in the magnification observation device 1 shown in FIG. 1, and showing the live screen 111 in which the whole of the display mosaic image and frame image are displayed at the same time. FIG. 7 shows a display range 112 including the whole of the display mosaic image and the whole of the live image in which the mosaic image and a part thereof are overlapped.

In this example, the live image made of continuous display frame images is displayed in a rectangular frame shown by a solid line. A display position of the rectangular frame showing the live image is decided based on the determination result of the relative position between the positioning mosaic image and the present positioning frame image.

The reduction ratio in the case of creating the display frame image and mosaic image by reducing the frame image and the retention mosaic image respectively is set so that the whole of the display mosaic image and the whole of the display frame image are displayed in the live screen 111 at the same time, a part of the display frame image being overlapped with the positioning mosaic image and corresponding to the positioning frame image at any position that has an overlap area necessary for determination of the relative position.

In this case, the display range 112 is set so that the display mosaic image and the display frame image, which corresponds to the positioning frame image at any position having a minimum overlap area necessary for determination of the relative position, are included; and an image in the display range 112 is displayed on the live screen 111. That is, the display range 112 is configured by a shape in which the display mosaic image is enlarged outward.

If the fetch instruction for assembling the still image is given in a state shown in FIG. 7, the still image having the same field of view as the live image during displaying is fetched and is coupled to the retention mosaic image to create a new retention mosaic image. The new retention mosaic image is reduced; and accordingly, the display mosaic image during displaying is updated.

FIG. 8 shows the display mosaic image updated by assembling the still image corresponding to the live image shown in FIG. 7 and the display range 112 changed in response to the update of the display mosaic image. The reduction ratio in the case of reducing the frame image and the retention mosaic image is updated each time the retention mosaic image is updated, and the display range 112 is adjusted so that the whole of the display mosaic image and the whole of the display frame image are included.

Figure 9:
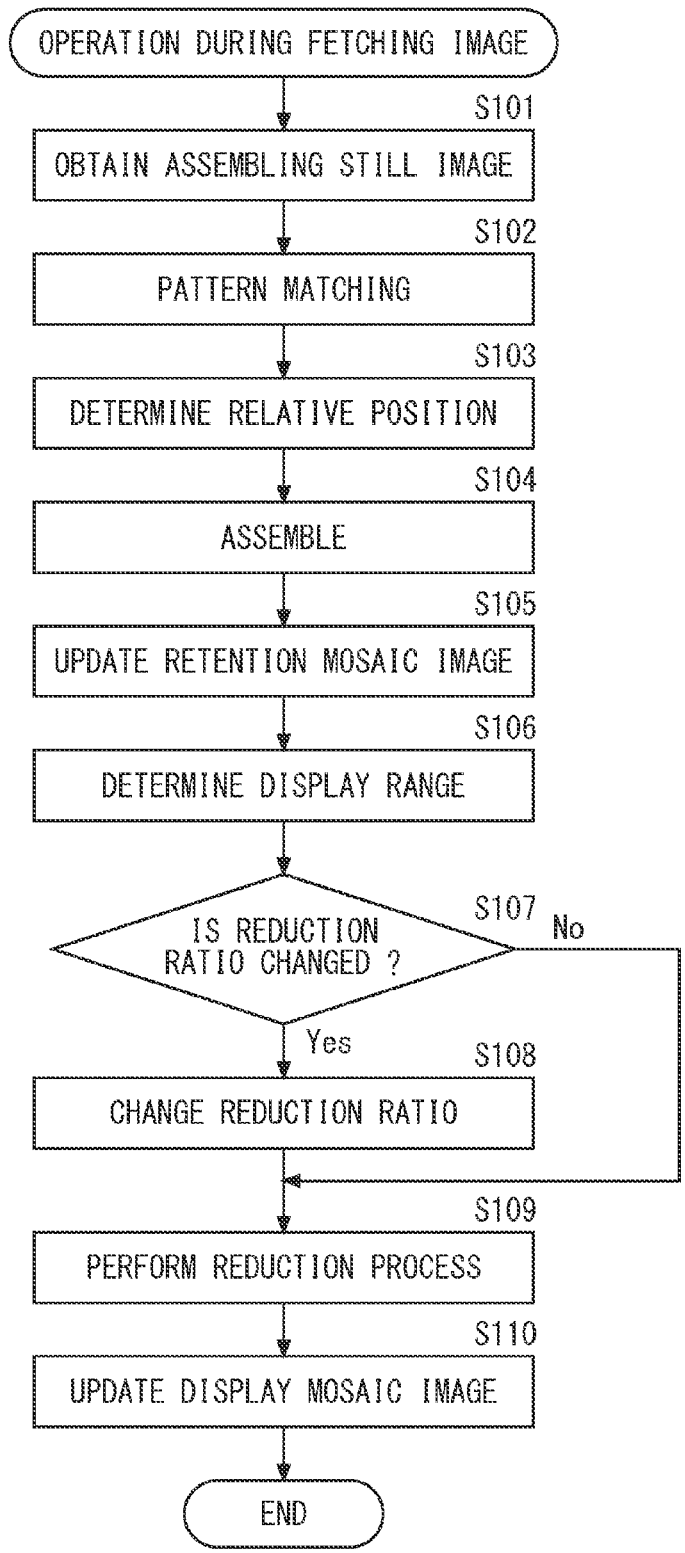
FIG. 9 is a flow chart showing an example of operation during fetching assembling images in the magnification observation device shown in FIG. 1.

Steps S101 to S110 shown in FIG. 9 are a flow chart showing an example of operation during fetching an assembling image in the magnification observation device 1 shown in FIG. 1. First, the still image obtaining unit 126 obtains an assembling still image from the camera 210 based on a fetch instruction from the console 300 (step S101).

By pattern matching between the obtained still image and the retention mosaic image read out from the retention mosaic image storage unit 124, the mosaic image generation unit 127 determines a relative position between these images and generates a new retention mosaic image by assembling these images (steps S102 to S104).

When the retention mosaic image in the retention mosaic image storage unit 124 is updated by the new retention mosaic image (step S105), the display reduction units 121 and 128 determine the display range 112 based on the image size of the updated retention mosaic image and decide a reduction ratio (step S106).

At this time, if the display range 112 cannot be contained in the live screen 111, a reduction process is performed by changing the reduction ratio so that the whole of the display range 112 is displayed (steps S107 to S109). On the other hand, if the display range 112 can be contained in the live screen 111, the reduction process is performed by the unchanged reduction ratio (steps S107 and S109).

When the display mosaic image in the display mosaic image storage unit 122 is updated, the live image update unit 123 reads out the updated mosaic image and updates the display mosaic image on the live screen 111 (step S110).

According to the present preferred embodiment, the reduction of the display image is performed based on the image size of the retention mosaic image; and therefore, even when the image size of the mosaic image is largely changed before and after the assembly, the whole of the display mosaic image can be displayed in the screen. Therefore, a positional relationship between a field of view during photographing and a mosaic image during creation can be easily recognized. More particularly, in the case of displaying the live image on the display mosaic image, the whole of the display mosaic image and the whole of the frame image can be always displayed at the same time; and therefore, it becomes possible to make a user easily recognize the positional relationship between the field of view during photographing and the mosaic image during creation.

Preferred Embodiment 2

In the preferred embodiment 1, the description is made about the example where the reduction ratio in the case of reducing the frame image and the retention mosaic image is decided so that the whole of the display mosaic image and the whole of the display frame image are displayed at the same time. On the other hand, in the present preferred embodiment, description will be made on the case where a reduction ratio is fixed when the image size of a mosaic image exceeds a constant size.

Display reduction units 121 and 128 operate to fix a reduction ratio in the case of reducing a frame image and a retention mosaic image when the image size of a retention mosaic image exceeds a constant size. That is, the reduction ratio is decided so that the whole of the display mosaic image and the whole of the display frame image are displayed in a live screen 111 at the same time and a reduction process is performed until the image size of the retention mosaic image exceeds the constant size.

On the other hand, in the case where the image size of the retention mosaic image exceeds the constant size, the reduction process is performed at the previous reduction ratio. In this case, a part of the display mosaic image and the whole of a live image are displayed in the live screen 111.

Figure 10:
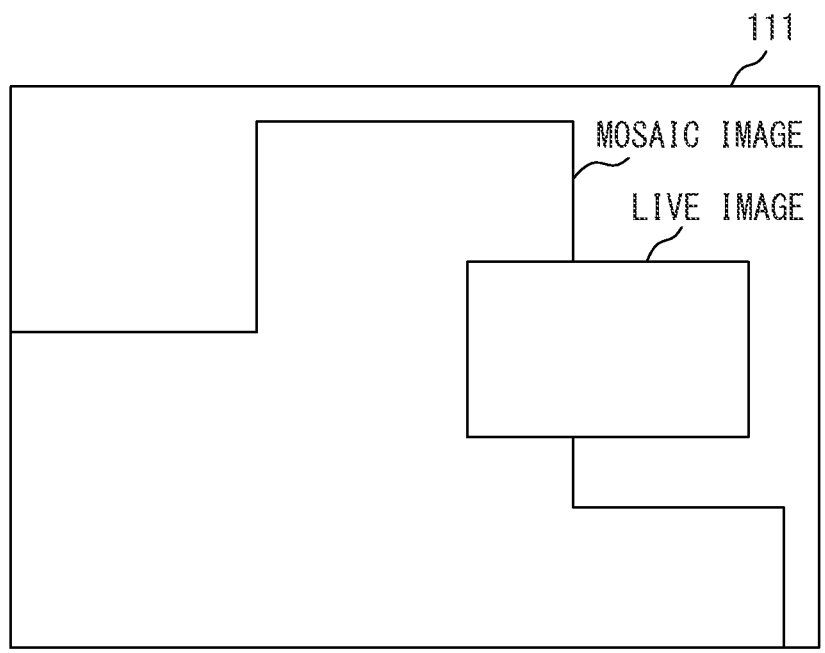
FIG. 10 is a diagram showing an example of operation during displaying a live image in a magnification observation device according to a preferred embodiment 2 of the present invention, and showing a live screen 111 on which a live image is displayed.

FIG. 10 is a diagram showing an example of operation during displaying the live image in a magnification observation device according to a preferred embodiment 2 of the present invention, and showing the live screen 111 on which the live image is displayed on the display mosaic image. In this example, the whole of the live image, in which a part of the display mosaic image and a part of the mosaic image are overlapped, is displayed.

In the present preferred embodiment, the reduction ratio is changed in response to the size of the mosaic image as in the preferred embodiment 1 until a predetermined reduction ratio. On the other hand, if the reduction ratio is excessively reduced, a positional relationship between a field of view during photographing and a mosaic image during creation becomes ungraspable. Thus, when the reduction ratio reaches the predetermined reduction ratio, the reduction ratio is not changed, but the live image and the adjacent mosaic image are displayed at display magnification in which the field of view during photographing becomes constant.

With such a configuration, when the image size of the retention mosaic image exceeds the constant size, the reduction ratio in the case of reducing the frame image and the retention mosaic image is fixed; and therefore, it becomes possible to suppress the positional relationship between the field of view during photographing and the mosaic image during creation from not to being recognized.

Preferred Embodiment 3

In the preferred embodiment 1, the description is made about the example where the whole of the display mosaic image and the whole of the display frame image are displayed, the display frame image corresponding to the positioning frame image at any position having the overlap area necessary for determination of the relative position. On the other hand, in the present preferred embodiment, description will be made on the case where a reduction ratio in the case of reducing a frame image and a retention mosaic image is updated each time a display position of a display frame image with respect to a display mosaic image is updated, and the whole of the display mosaic image and the whole of the updated display frame image are displayed.

Display reduction units 121 and 128 operate to update the reduction ratio in the case of reducing the frame image and the retention mosaic image each time the display position of the display frame image with respect to the display mosaic image is updated.

With such a configuration, the reduction ratio in the case of reducing the frame image and the retention mosaic image is updated each time the display position of the display frame image is updated; and therefore, it becomes possible to appropriately display the whole of the display mosaic image and the frame image in a live screen 111 by following the update of the display position.

Preferred Embodiment 4

In the preferred embodiment 1, the description is made about the case where the reduction ratio in the case of reducing the frame image and the retention mosaic image for displaying the live screen is decided so that the whole of the display mosaic image and the whole of the display frame image are displayed at the same time. On the other hand, in the present preferred embodiment, description will be made on the case where a moving recommendation area of a frame image capable of determining a relative position is displayed on a mosaic image and a reduction ratio is decided so that the frame image and the mosaic image in the moving recommendation area are displayed at the same time.

Figure 11:
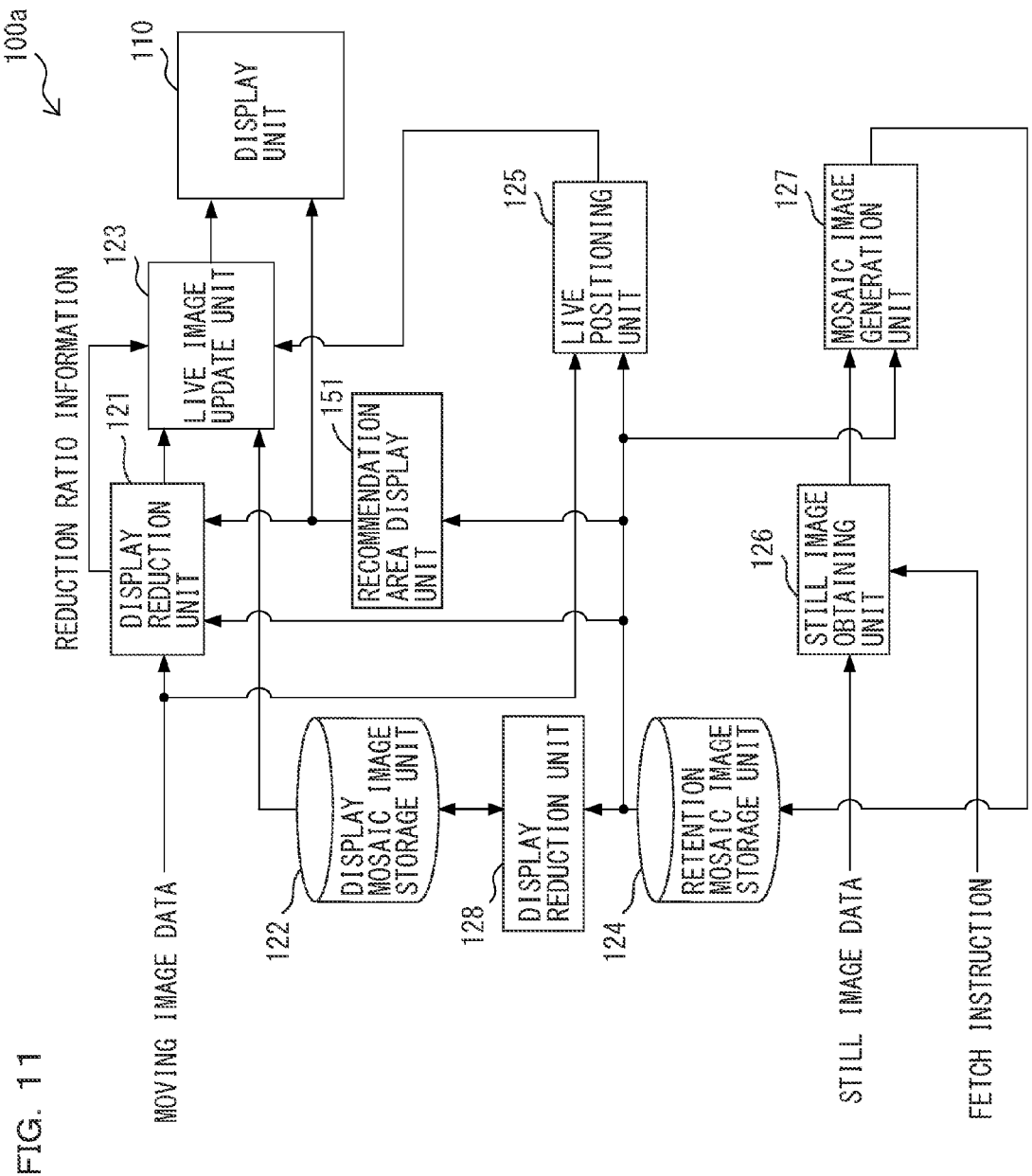
FIG. 11 is a block diagram showing a configuration example in a relevant portion of a magnification observation device according to a preferred embodiment 4 of the present invention, and showing an example of a functional configuration in a system body.

FIG. 11 is a block diagram showing a configuration example in a relevant portion of a magnification observation device according to a preferred embodiment 4 of the present invention, and showing an example of a functional configuration in a system body 100a. The system body 100a is different in that a recommendation area display unit 151 is provided as compared with the system body 100 shown in FIG. 2.

The recommendation area display unit 151 operates to display a moving recommendation area of a frame image on a mosaic image. The moving recommendation area is an area of constant shape and size that has an overlapping area with the mosaic image, and a display position with respect to the mosaic image is decided based on the image size of a retention mosaic image. More specifically, among areas capable of determining a relative position between the frame image and the mosaic image, an area where the area of the overlapping area with the mosaic image is the minimum is displayed as the moving recommendation area.

Display reduction units 121 and 128 operate to reduce the frame image and the retention mosaic image so that the frame image and the mosaic image in the moving recommendation area are displayed at the same time. More specifically, operation is performed that a reduction ratio in the case of reducing the frame image and the retention mosaic image for displaying a live screen is decided so that at least the whole of the frame image and the whole of the mosaic image in the moving recommendation area are displayed.

A display position of the moving recommendation area is updated each time the retention mosaic image is updated, and the reduction ratio is changed in response to the update of the mosaic image and the moving recommendation area.

<Moving Recommendation Area>

FIG. 12 is a view showing an example of operation during displaying the live screen in the magnification observation device shown in FIG. 11, and showing the moving recommendation area displayed on the mosaic image. A display mosaic image corresponding to the retention mosaic image during creation, a live image showing a field of view during photographing, and the moving recommendation area are displayed in a live screen 111.

In this example, the live image configured by the display frame image is arranged in a rectangular frame shown by a solid line. A display position of the rectangular frame is changed based on a determination result of a relative position between a reference image (a part of the mosaic image) and a present positioning frame image.

On the other hand, the moving recommendation area represents a position with respect to the mosaic image optimal for assembling a still image, and is shown by a rectangular frame shown by a dashed line. In this example, the moving recommendation area is formed so that the moving recommendation area is slightly larger than the display frame image, the still image is assembled at positioning accuracy not less than a constant level, and an overlapping area, which is optimal for minimizing the number of still images necessary for creating the mosaic image having a desired size, is obtained.

Incidentally, in the preferred embodiments 1 to 4, the description is made about the example where the top in which edges are intersected is extracted as the feature quantity in the case of comparing the positioning frame image and the positioning mosaic image; however, the present invention is not limited to this. For example, for a predetermined area on the image, a contrast value in the area, serving as the feature quantity, may be extracted from the positioning frame image and the positioning mosaic image respectively to compare the extracted contrast values with these images.

Furthermore, in the preferred embodiments 1 to 4, the description is made about the example where the relative positional relationship between the positioning mosaic image and the frame image is determined by pattern matching therebetween; however, the present invention is not limited to this. For example, a position sensor which detects a position in an x axis direction and a Y axis direction of a movable stage 230 may be included to determine a relative position between the frame image and the mosaic image based on an output of the position sensor.

What is claimed is:

1. An imaging device comprising:
a movable stage capable of moving in two different directions while mounting an object to be inspected;
a camera which is arranged in face-to-face relation to the movable stage, photographs the object to be inspected, and generates a moving picture image made of a plurality of sequential frame images;
a mosaic image generating processing device which assembles not less than two still images photographed by the camera, and generates a mosaic image that is wider in field of view than the actual field of view of the camera;
a relative position determination unit which determines a relative position between the frame image and the mosaic image;
a display reduction unit comprising a processor configured to average pixel values and to reduce the frame image and the mosaic image respectively based on the image size of the mosaic image, and generates a display frame image and a display mosaic image;
a live image display unit which updates a display position of the display frame image with respect to the display mosaic image based on a determination result of the relative position, and displays a moving picture image configured by the display frame images on the display mosaic image,
a still image obtaining unit which obtains a still image photographed by the camera based on a fetch instruction while displaying the moving picture image on the display mosaic image by the live image display unit; and
wherein the mosaic image generating processing device determines a relative position between the still image and the mosaic image, and assembles the still image and the mosaic image to generate a new mosaic image,
wherein a reduction ratio is set so that the whole of the display mosaic image and the whole of the display frame image, at any position that has an overlap area necessary for determination of the relative position, are displayed at the same time.

2. The imaging device according to claim 1, wherein
the display reduction unit reduces the frame image and the mosaic image so that the whole of the display mosaic image is displayed in a screen.

3. The imaging device according to claim 1, wherein
the display reduction unit reduces the frame image and the mosaic image so that the whole of the display mosaic image and the whole of the display frame image are displayed at the same time.

4. The imaging device according to claim 1, wherein
the display reduction unit reduces the frame image and the mosaic image while retaining an aspect ratio of an image constant.

5. The imaging device according to claim 3, wherein the display reduction unit updates a reduction ration in the case of reducing the frame image and the mosaic image each time the display position of the display frame image with respect to the display mosaic image is updated.

6. The imaging device according to claim 3, further comprising:
a recommendation area display unit display moving recommendation are of the frame image including an overlapping area with the mosaic image, and the moving recommendation area is capable of determing the relative position between the frame image and the mosaic image, wherein
the display reduction unit reduces the frame image and the mosaic image so that the frame image and the mosaic image in the moving recommendation area are displayed at the same time.

7. The imaging device according to claim 1, further comprising:
a positioning reduction section which reduces the frame image and the mosaic image at a constant reduction ratio respectively, and generates a positioning frame image and a positioning mosaic image; and
a feature quantity extraction unit which extracts feature quantity from the positioning frame image and the positioning mosaic image, wherein
the relative position determination unit determines a relative position between the positioning frame image and the positioning mosaic image by comparison of the feature quantity; and wherein
the display reduction unit reduces the frame image and the mosaic image so that the whole of the display mosaic image and the whole of the display frame image corresponding to the positioning frame image at any position that has an overlap area necessary for determination of the relative position are displayed in a screen.

8. The imaging device according to claim 1, wherein the display reduction unit fixes a reduction ratio in the case of reducing the frame image and the mosaic image when the image size of the mosaic image exceeds a constant size.

9. The imaging device according to claim 1, further comprising:
- a retention mosaic image storage unit which retains a retention mosaic image generated by the mosaic image generation unit;
- wherein the display reduction unit operates to read out the retention mosaic image from the retention mosaic image storage unit, and reduces the retention mosaic image for display; and
- a display mosaic image storage unit which retains the display mosaic image generated by the display reduction unit.

10. The imaging device according to claim 9, wherein the relative position determination unit determines a relative position between the display frame image and the display mosaic image by a matching process, and wherein the matching process is executed with lower accuracy than a matching process between the retention mosaic image and the still image.

* * * * *